(12) United States Patent
Kim et al.

(10) Patent No.: US 11,517,144 B2
(45) Date of Patent: Dec. 6, 2022

(54) EXPANDABLE COVER UNIT

(71) Applicant: Industry-Academic Cooperation Foundation, Chosun University, Gwangju (KR)

(72) Inventors: Chang Lae Kim, Gwangju (KR); Myeong Hwan Choi, Gwangyang-si (KR); Seung Ju Seo, Gwangyang-si (KR); Chang Nyung Han, Suncheon-si (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 378 days.

(21) Appl. No.: 16/799,324

(22) Filed: Feb. 24, 2020

(65) Prior Publication Data

US 2020/0268198 A1   Aug. 27, 2020

(30) Foreign Application Priority Data

Feb. 26, 2019   (KR) .................. 10-2019-0022471

(51) Int. Cl.
*A47J 36/06*   (2006.01)
*A47J 45/06*   (2006.01)

(52) U.S. Cl.
CPC ............. *A47J 36/06* (2013.01); *A47J 45/063* (2013.01)

(58) Field of Classification Search
CPC ........ A47J 36/06; A47J 36/062; A47J 36/064; A47J 36/066; A47J 36/10
See application file for complete search history.

(56) References Cited

U.S. PATENT DOCUMENTS

| 4,401,228 | A | * | 8/1983 | Baldelli | ................... | A47J 36/06 |
| | | | | | | 215/360 |
| 6,758,131 | B1 | * | 7/2004 | Joubert | ................. | A47J 37/101 |
| | | | | | | 220/573.1 |
| 9,788,680 | B1 | * | 10/2017 | Giugliano | ............... | A47J 36/06 |

FOREIGN PATENT DOCUMENTS

| JP | 2005124689 A | * | 5/2005 | | |
| KR | 19990042012 U | * | 12/1999 | | |
| KR | 20030010896 A | * | 2/2003 | ............. | A47J 36/06 |
| KR | 20040042266 A | * | 5/2004 | .......... | A47J 27/0815 |
| KR | 20120079765 A | * | 7/2012 | ............. | A47G 23/00 |
| KR | 10-2018-0058410 A | | 6/2018 | | |

* cited by examiner

*Primary Examiner* — John J Norton
(74) *Attorney, Agent, or Firm* — Studebaker & Brackett PC

(57) ABSTRACT

The present disclosure relates to an expandable cover unit including a main body, a manipulation member installed on the main body to be rotatable or moveable upward or downward, an expanding portion installed on the main body at a position adjacent to the manipulation member and provided with at least one wing member installed on the main body to be slidable in a direction away from the manipulation member such that an end portion of the wing member protrudes outward from the main body, and a wing driving unit configured to operate the wing member to move the wing member according to the manipulation member rotated or moved upward or downward by a manipulation of a user.

5 Claims, 13 Drawing Sheets

EXPANDABLE COVER UNIT

CROSS-REFERENCE TO RELATED APPLICATION

This application claims priority to and the benefit of Korean Patent Application No. 10-2019-0022471, filed on Feb. 26, 2019, the disclosure of which is incorporated herein by reference in its entirety.

BACKGROUND

1. Field of the Invention

The present invention relates to an expandable cover unit, and more specifically, to an expandable cover unit of which an area is easily expandable or shrinkable.

2. Discussion of Related Art

A cover unit such as a pot-lid is coupled to an upper portion of a container such as a pot to close an inner space of the container. Such a cover unit includes a main body formed to have an area corresponding to an open portion of the container and a gripping member installed on the main body.

However, since areas of the conventional cover units are fixed according to an intended purpose when the conventional cover units are manufactured, there is a disadvantage in that it is relatively limited in the use.

RELATED ART DOCUMENT

Patent Document (Patent Document 1) Korean Patent Publication No. 10-2018-0058410: PAN COVER

SUMMARY OF THE INVENTION

The present invention is directed to providing an expandable cover unit of which an area is expandable because a wing member slidably installed in a main body is provided.

According to an aspect of the present invention, there is provided an expandable cover unit including a main body, a manipulation member installed on the main body to be moved by manipulation of a user, an expanding portion installed on the main body at a position adjacent to the manipulation member and provided with one or more wing members installed on the main body to be slidable in a direction away from the manipulation member such that an end portion of the wing member protrudes outward from the main body, and a wing driving unit configured to operate the wing member to move the wing member according to the manipulation member moved by the manipulation of the user.

The wing driving unit may include a fixed magnet installed on one end portion of the wing member facing the manipulation member and having a predetermined magnetic force, an attractive magnet which is installed on an outer circumferential surface of the manipulation member and generates an attractive force with respect to the fixed magnet to move the wing member toward the manipulation member when the manipulation member rotates or moves upward or downward such that the attractive magnet faces the fixed magnet, and a repulsive magnet which is installed on the outer circumferential surface of the manipulation member at a position spaced apart from the attractive magnet in a direction in which the manipulation member rotates or moves upward or downward, and generates a repulsive force with respect to the fixed magnet to move the wing member in the direction away from the manipulation member when the manipulation member rotates or moves upward or downward such that the repulsive magnet faces the fixed magnet.

The manipulation member may be installed on the main body to be moveable upward and downward, and the wing driving unit may include at least one connecting member of which both ends are installed at the manipulation member and the wing member such that the wing member is close to or spaced apart from the manipulation member when the manipulation member moves upward or downward with respect to the main body.

The manipulation member may be rotatably installed on the main body, and the wing driving unit may include a driven gear part installed on an outer circumferential surface of the manipulation member and provided with a plurality of first gear teeth spaced apart from each other in a circumferential direction, a first idle pulley rotatably installed on the main body at a position adjacent to the manipulation member to be engaged with the driven gear part, a second idle pulley installed on the main body at a position spaced apart from the first idle pulley in a sliding direction of the wing member, and a timing belt installed around the driven gear part and the idle pulleys, moved by rotation of the first idle pulley, and having one side fixed to the wing member.

The expanding portion may include a plurality of first wing members slidably installed on the main body to be spaced apart from each other in a virtual circle having a predetermined radius around the manipulation member, and a plurality of second wing members slidably installed on the main body between the first wing members.

The first wing member may include a first extension panel installed on the main body such that one end portion of the first extension panel faces the manipulation member and extending a predetermined length in a sliding direction of the first wing member, and a first expanding panel formed on the other end portion of the first extension panel to protrude outward from the main body when the first extension panel moves in the direction away from the manipulation member, extending in a direction intersecting a longitudinal direction of the first extension panel, and provided with an inlet recessed downward a predetermined depth with respect to an upper surface of the first expanding panel.

The second wing member may include a second extension panel installed on the main body such that one end portion of the second extension panel faces the manipulation member and extending a predetermined length in a sliding direction of the second wing member, and a second expanding panel formed on the other end portion of the second extension panel to protrude outward when the second extension panel moves in the direction away from the manipulation member, and extending toward the first expanding panel to be inserted into the inlet when the first and second wing members move to be close to the manipulation member.

The wing members may be slidably installed on the main body to be spaced apart from each other along a virtual circle having a predetermined radius around the manipulation member, and the expanding portion may further include a gap cover member which is installed to be moveable into and out of the wing member in a direction intersecting a sliding direction of the wing member, is inserted into the wing member in a case in which the wing member is close to the manipulation member, and protrudes from the wing member in a case in which the wing member moves in the direction away from the manipulation member.

The wing member may include an extension panel installed on the main body such that one end portion of the extension panel faces the manipulation member and extending a predetermined length in a sliding direction of a first wing member, and an expanding panel formed on the other end portion of the extension panel to protrude outward from the main body when a first extension panel moves in the direction away from the manipulation member, extending in a direction intersecting a longitudinal direction of the extension panel, and having an end portion in which an insertion hole is formed such that the gap cover member is inserted into the insertion hole and is moveable into and out of the insertion hole, and the expanding portion may further include an attachment member installed on the gap cover member to attach an end portion of the gap cover member inserted into the insertion hole of the wing member to another wing member adjacent to the wing member.

Any one end portion of two end portions of the manipulation member may be detachably coupled to the main body at a position adjacent to one end portion of the wing member, and the wing driving unit may include a fixed magnet installed the on one end portion of the wing member facing the manipulation member and may have a predetermined magnetic force, an attractive magnet which is installed on the one end portion of the manipulation member and generates an attractive force with respect to the fixed magnet to move the wing member toward the manipulation member when the one end portion of the manipulation member is coupled to the main body, and a repulsive magnet which is installed on the other end portion of the manipulation member and generates a repulsive force with respect to the fixed magnet to move the wing member in the direction away from the manipulation member when the other end portion of the manipulation member is coupled to the main body.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
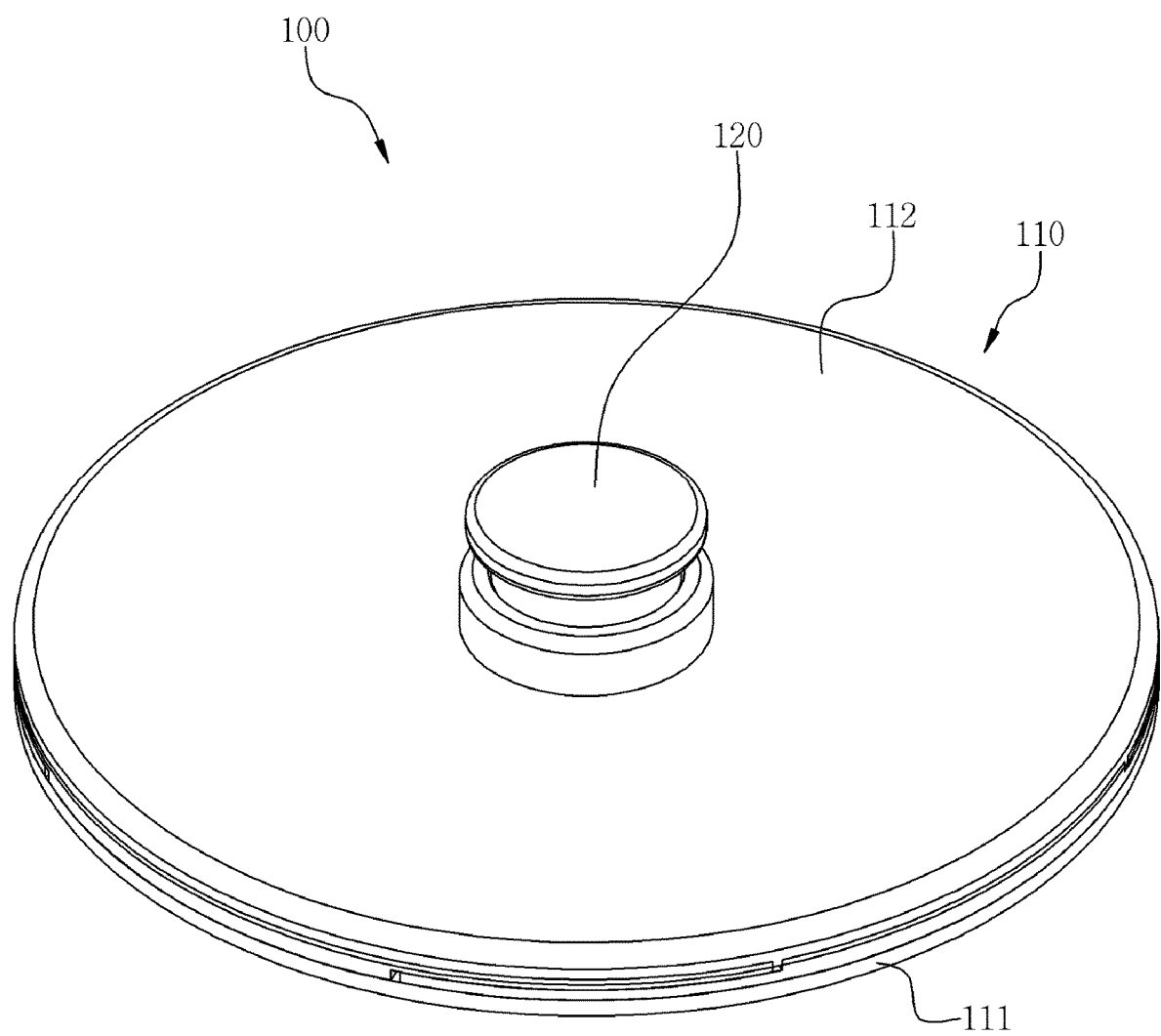
FIG. 1 is a perspective view illustrating an expandable cover unit according to an embodiment of the present invention.
Figure 2:
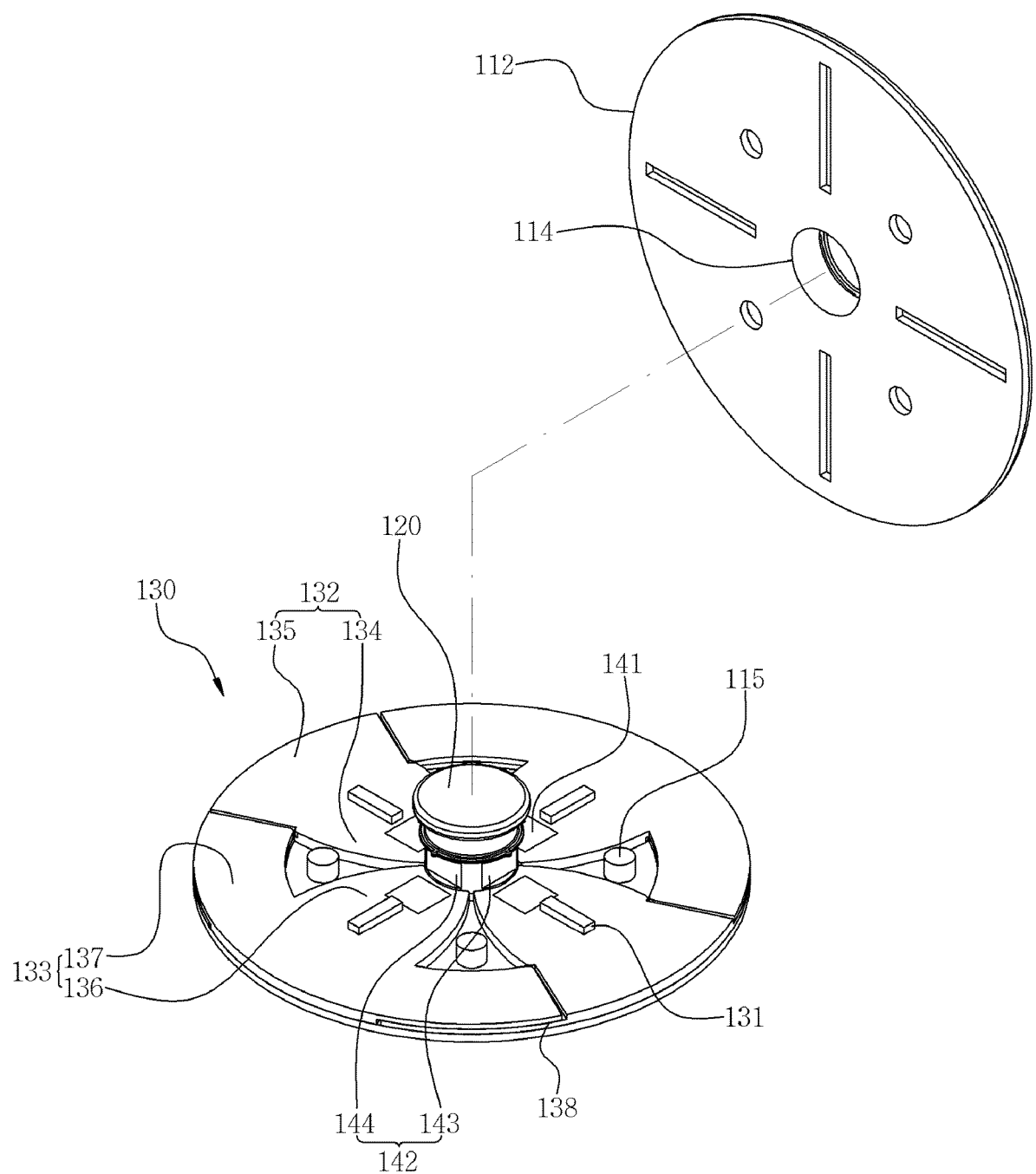
FIG. 2 is an exploded perspective view illustrating the expandable cover unit of FIG. 1.
Figure 3:
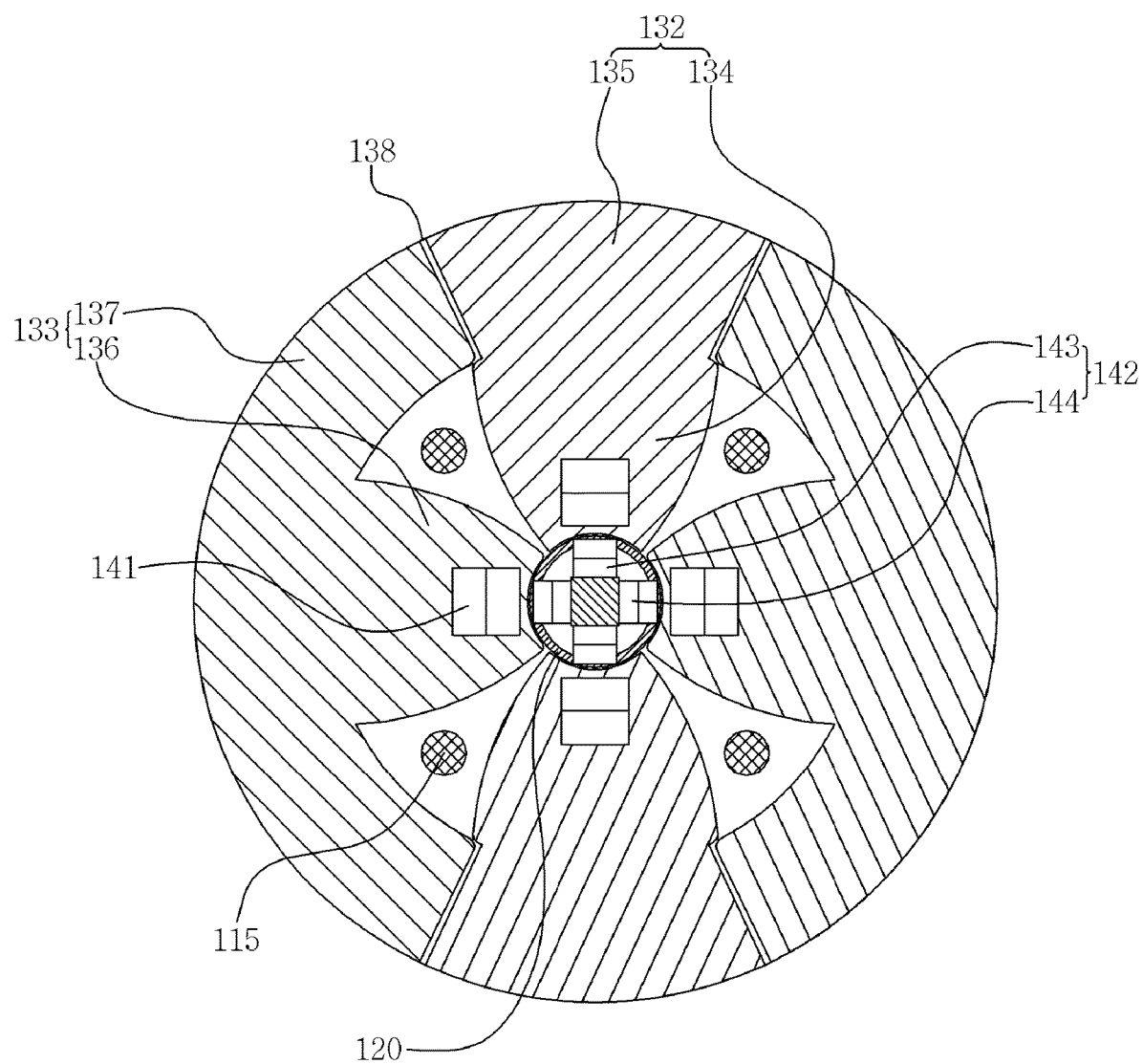
FIGS. 3 and 4 are plan views illustrating operating states of the expandable cover unit of FIG. 1.
Figure 4:
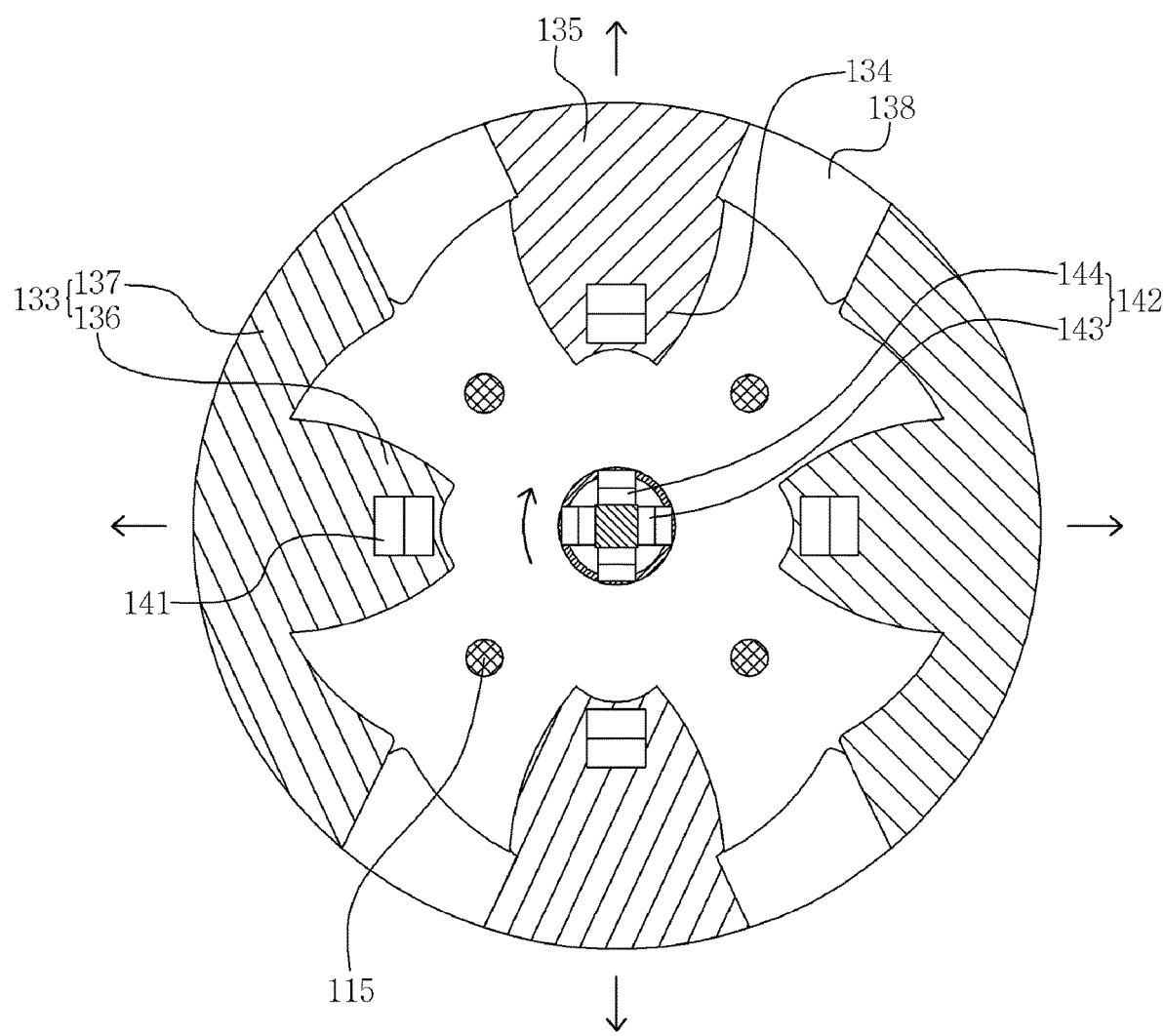

Hereinafter, an expandable cover unit will be described in detail with reference to the accompanying drawings. Since the present invention allows for various changes and numerous embodiments, specific embodiments will be illustrated in the drawings and described in detail in the written description. However, this is not intended to limit the present invention to specific embodiments, and it is to be appreciated that all changes, equivalents, and substitutes that do not depart from the spirit and technical scope of the present invention are encompassed in the present invention. Like numbers refer to like elements throughout the description of the figures. In the accompanying drawings, sizes of structures may be greater than those of actual structures for clarity of the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention.

The terminology used herein to describe the embodiments of the present invention is not intended to limit the scope of the present invention. The articles "a," "an," and "the" are singular in that they have a single referent, however the use of the singular form in the present document does not preclude the presence of more than one referent unless the context clearly indicates otherwise. It should be further understood that the terms "comprise," "comprising," "include," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms including technical and scientific terms used herein are to be interpreted as is customary in the art to which this invention belongs. It should be further understood that terms in common usage should also be interpreted as is customary in the relevant art and not in an idealized or overly formal sense unless expressly so defined herein.

An expandable cover unit 100 according to an embodiment of the present invention is illustrated in FIGS. 1 to 4.

Referring to the drawings, the expandable cover unit 100 includes a main body 110, a manipulation member 120 installed on the main body 110 to be moved by a manipulation of a user, an expanding portion 130 which is installed on the main body 110 at a position adjacent to the manipulation member 120 and provided with one or more wing members installed on the main body 110 to be slidable in a direction away from the manipulation member 120 such that an end portion of the expanding portion 130 protrudes outward from the main body 110, and a wing driving unit 140 configured to operate the wing members to move the wing members according to the manipulation member 120 moved by the manipulation of the user.

The main body 110 includes a lower case 111 and an upper case 112 installed to be spaced upward from the lower case 111 due to supporting members 113 so as to provide an installation space for installing the expanding portion 130 on the lower case 111.

The lower case 111 is formed to have a disc shape having a predetermined radius and has a central portion which is rotatably coupled to a lower end portion of the manipulation member 120. The plurality of supporting members 113 are formed on an upper surface of the lower case 111. The supporting members 113 vertically extend predetermined lengths and are radially disposed around the central portion of the lower case 111.

The upper case 112 is formed to have a disc shape corresponding to the lower case 111 and has a central portion in which a hollow 114 is formed so that the manipulation member 120 may be inserted into the hollow 114. A lower surface of the upper case 112 is fixedly supported by upper ends of the supporting members 113 to be spaced upward from the lower case 111.

In addition, a plurality of guide grooves 115 are formed in the upper case 112 such that guide protrusions 131 of the expanding portion 130 are allowed to be inserted into the plurality of guide grooves 115. The guide grooves 115 extend predetermined lengths in a sliding direction of the wing members, that is, from the hollow 114 toward an edge of the upper case 112, and the plurality of guide grooves 115 are radially formed around the hollow 114.

The manipulation member 120 is formed to have a cylindrical shape vertically extending a predetermined length, is inserted into the hollow 114, and is installed to be rotatable in the upper case 112 and the lower case 111. In this case, an upper end portion of the manipulation member 120 may be installed to protrude from the upper case 112 such that the user can easily grip the manipulation member 120.

The expanding portion 130 includes a plurality of first wing members 132 slidably installed on the main body 110 to be spaced apart from each other along a virtual circle having a predetermined radius around the manipulation member 120 and a plurality of second wing members 133 slidably installed between the first wing members 132 on the main body 110.

The first wing members 132 are installed between the upper case 112 and the lower case 111 and two first wing members 132 are installed at opposite sides with respect to the manipulation member 120. The first wing member 132 includes a first extension panel 134 and a plurality of first expanding panels 135.

The first extension panel 134 extends a predetermined length in a sliding direction of the first wing member 132, that is, in a radial direction of the lower case 111. In this case, the first extension panel 134 may be formed to have a width increasing in a direction from one end portion adjacent to the manipulation member 120 toward the other end portion. In addition, the guide protrusion 131 is formed on an upper surface of the first extension panel 134 to protrude upward so as to be inserted into the guide groove 115 so that the first extension panel 134 move along the guide groove 115.

The first expanding panel 135 extends from the other end portion of the first extension panel 134 in a direction intersecting a longitudinal direction of the first extension panel 134 to protrude outward from the main body 110 when the first extension panel 134 moves in a direction away from the manipulation member 120. In this case, the first expanding panel 135 extends in a direction in which two end portions thereof move in opposite directions away from the first extension panels 134 and may be formed to be bent so as to have a curvature corresponding to a curvature of an edge of the lower case 111.

In addition, an inlet 138 recessed a predetermined depth in a downward direction with respect to an upper surface of the first expanding panel 135 is provided in each of the two end portions of the first expanding panel 135 such that second expanding panel 137 of the second wing member 133 is inserted into the inlet 138.

The second wing member 133 is installed between the upper case 112 and the lower case 111 to be slidable in the radial direction of the lower case 111. The second wing member 133 includes a second extension panel 136 and a plurality of second expanding panels 137.

The second extension panel 136 is installed on the main body 110 such that one end portion of the second extension panel 136 faces the manipulation member 120 and extends a predetermined length in a sliding direction of the second wing member 133, that is, the radial direction of the lower case 111. In this case, the second extension panel 136 may be formed to have a width which increases in the direction from one end portion of the second extension panel 136, which is adjacent to the manipulation member 120, toward the other end portion. In addition, a guide protrusion 131 is formed on an upper surface of the second extension panel 136 to protrude upward so as to be inserted into the guide groove 115 so that the second extension panel 136 moves along the guide groove 115.

The second expanding panel 137 is formed at the other end portion of the second extension panel 136 to protrude outward when the second extension panel 136 moves in a direction away from the manipulation member 120.

In this case, the second expanding panel 137 extends in a direction, in which the two end portions of the second expanding panel 137 move in opposite directions away from the second extension panels 136 and may be formed to be bent so as to have a curvature corresponding to the curvature of the edge of the lower case 111. In this case, the second expanding panel 137 is formed to be recessed upward a predetermined depth with respect to a lower surface of the second expanding panel 137 so that the two end portions of the second expanding panels 137 are inserted into the inlets 138 of the first expanding panel 135.

That is, when the first wing member 132 and the second wing member 133 move to be close to the manipulation member 120, that is, the first wing member 132 and the second wing member 133 move to be inserted between the lower case 111 and the upper case 112, the two end portions of the second expanding panel 137 of the second wing member 133 are inserted into the inlet 138 of the first wing member 132 so that a volume of the expanding portion 130 is shrunk. In addition, when the first wing member 132 and the second wing member 133 move in the direction away from the manipulation member 120, that is, the first wing member 132 and the second wing member 133 are withdrawn from between the lower case 111 and the upper case 112, the first expanding panel 135 and the second expanding panel 137 protrude outward from the main body 110, and the two end portions of the second expanding panels 137 are withdrawn from the inlet 138 of the first expanding panel 135 so that the volume is expanded more.

Figure 5:
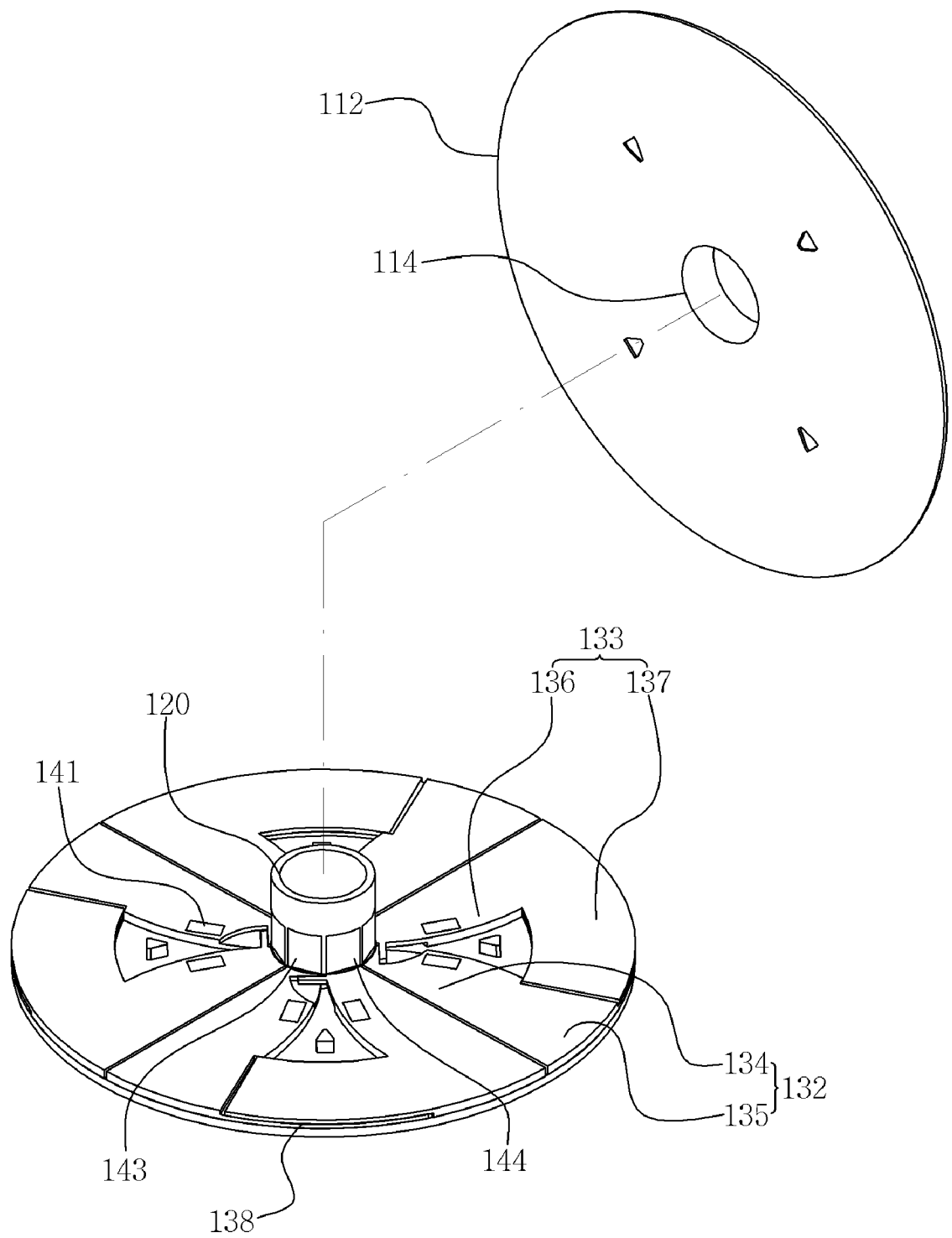
FIG. 5 is an exploded perspective view illustrating an expandable cover unit according to another embodiment of the present invention.

Meanwhile, an expanding portion 130 according to another embodiment of the present invention is illustrated in FIG. 5.

Components having the same functions as those in the previous drawings will be referred to with the same reference symbols.

Referring to the drawing, an expanding portion 130 includes four first wing members 132 and four second wing members 133. In this case, the first and second wing members 132 and 133 are alternately disposed in a circumferential direction of a lower housing.

In addition, a first expanding panel 135 of the first wing member 132 is formed on a side surface of the first extension panel 134 which face any one, which is adjacent to the first expanding panel, of the second wing members 133. In addition, the second expanding panel 137 of the second wing member 133 is formed on a side surface of the second extension panel 136 facing the second expanding panel 137.

Figure 6:
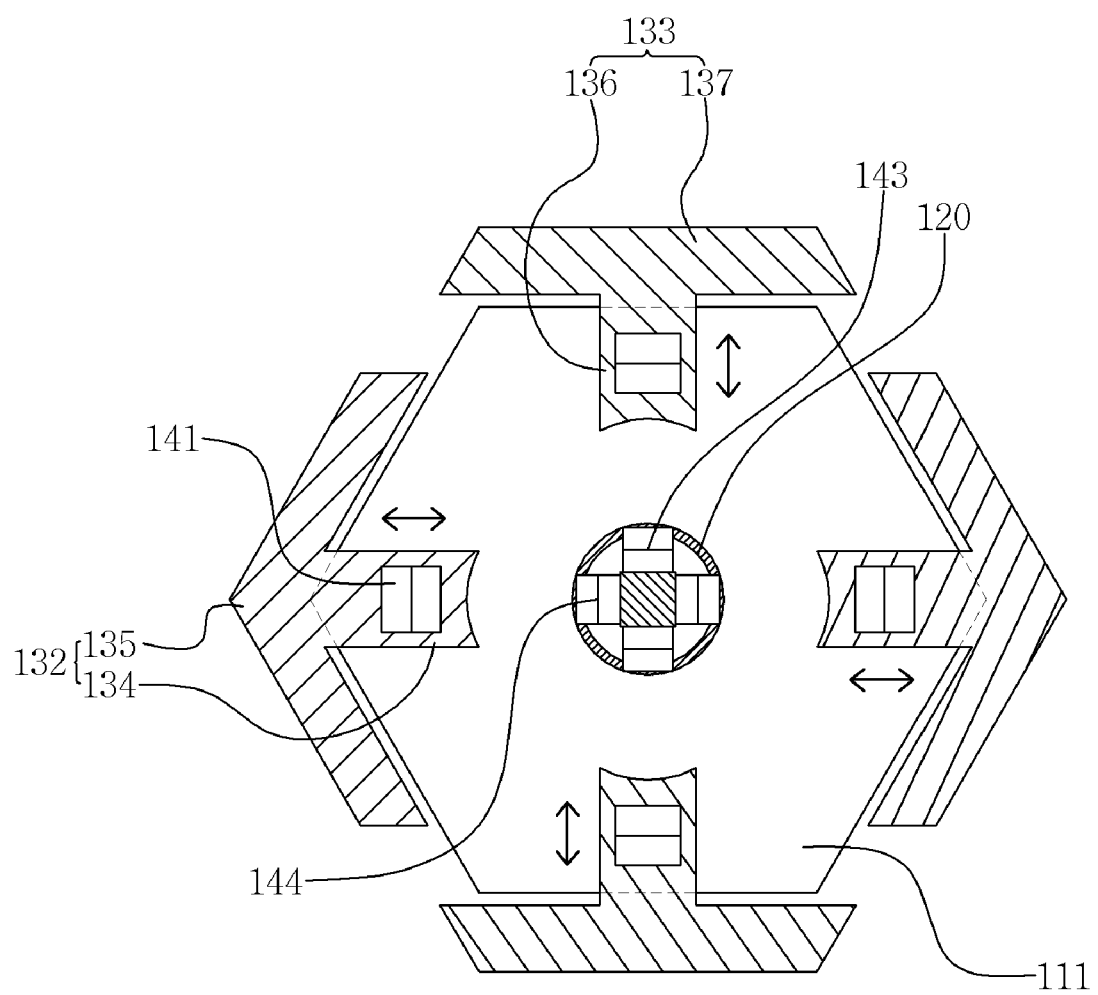
FIG. 6 is a plan view illustrating an expandable cover unit according to still another embodiment of the present invention.
Figure 7:
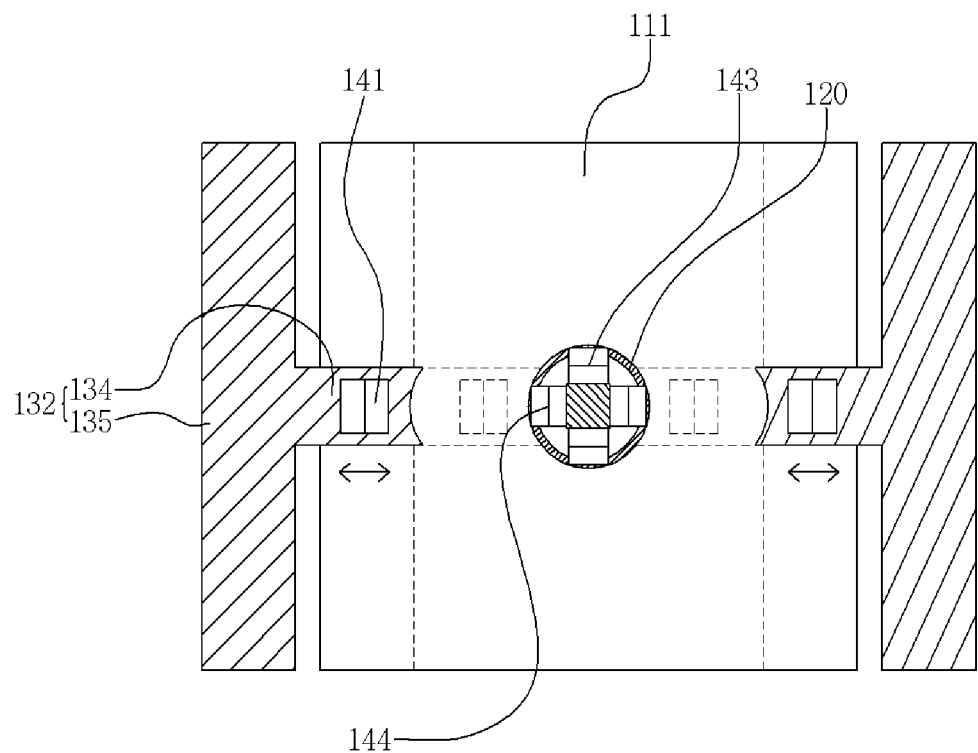
FIG. 7 is a plan view illustrating an expandable cover unit according to yet another embodiment of the present invention.
Figure 8:
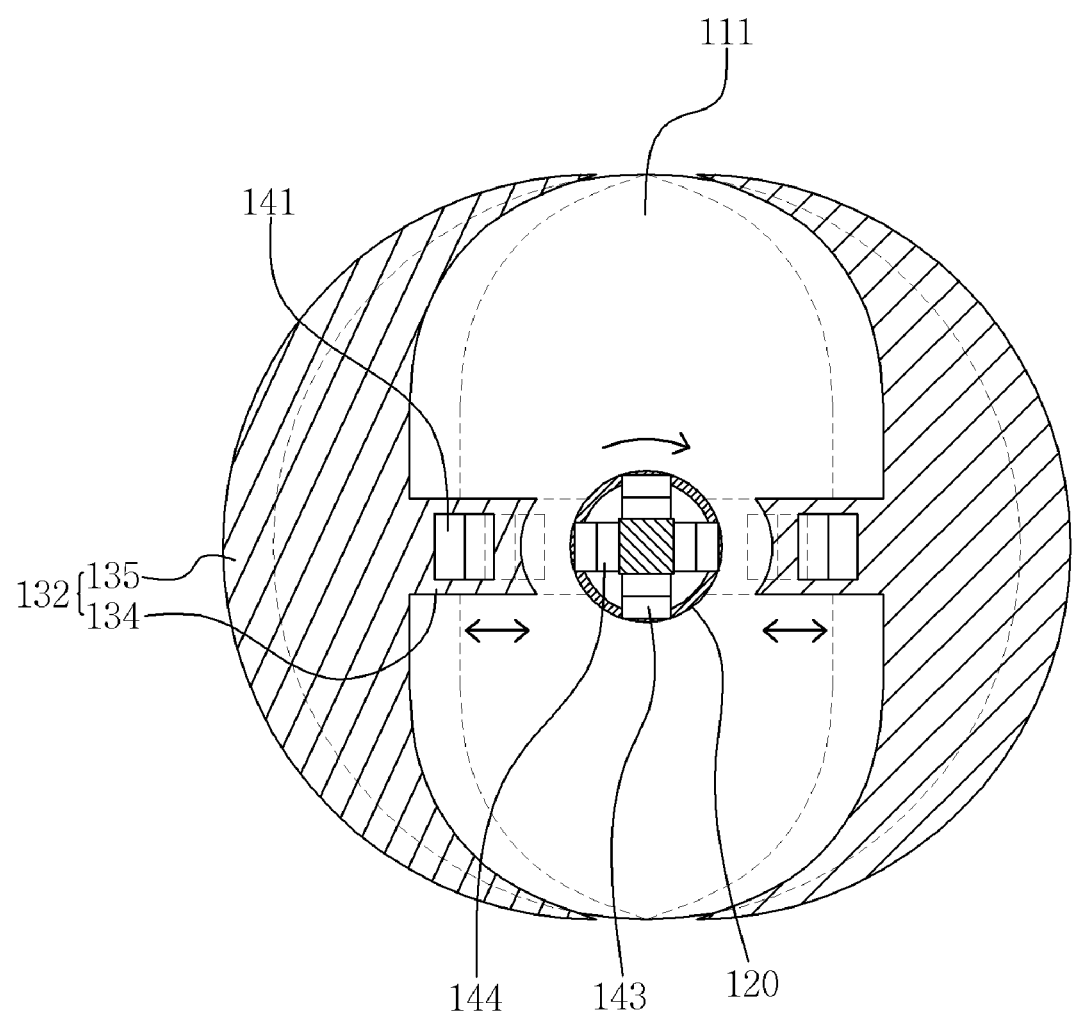
FIG. 8 is a plan view illustrating an expandable cover unit according to yet another embodiment of the present invention.
Figure 9:
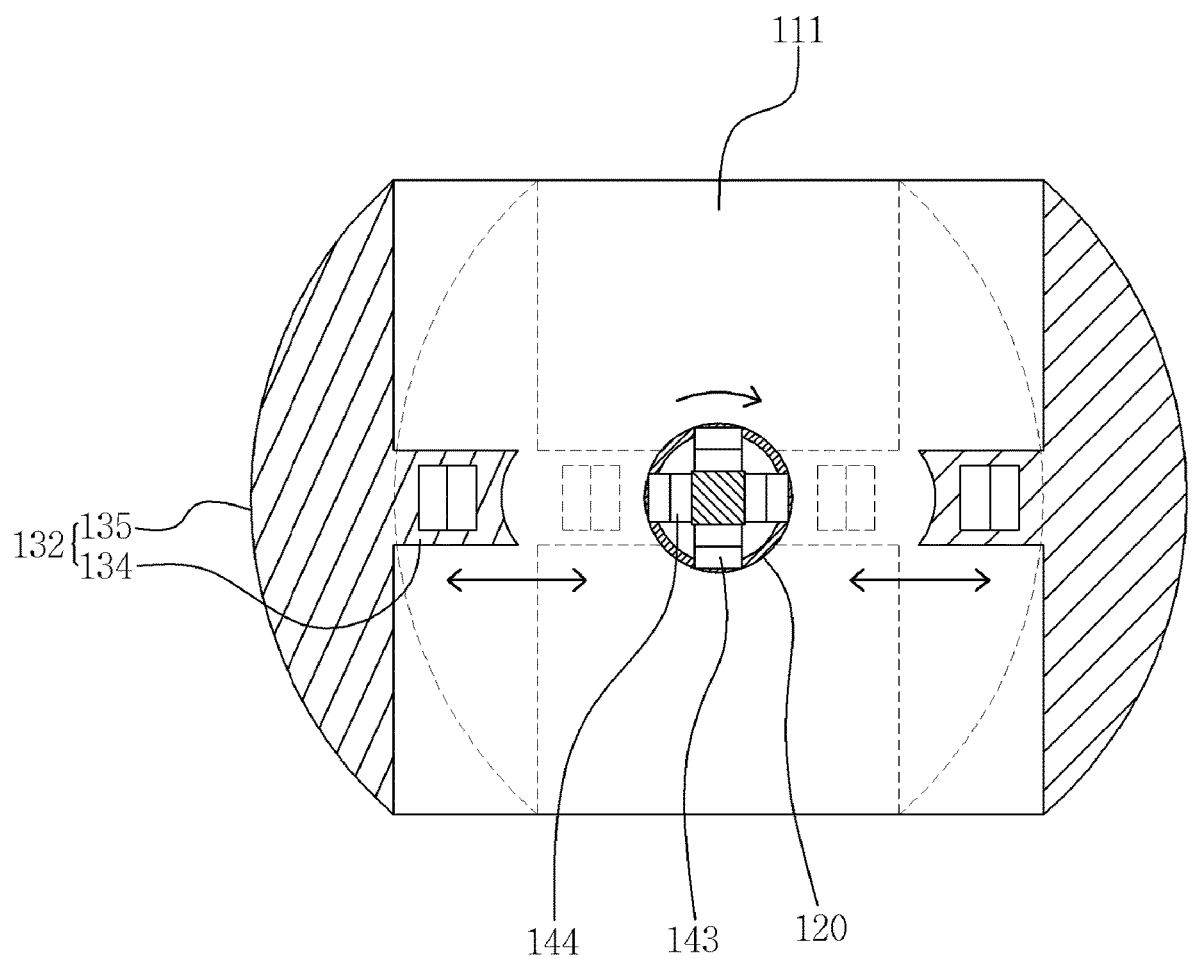
FIG. 9 is a plan view illustrating an expandable cover unit according to yet another embodiment of the present invention.

In addition, referring to FIG. 6, a lower case 111 and an upper case 112 are formed to have a hexagonal plate shape, first expanding panels 135 of first wing members 132 and second expanding panels 137 of second wing members 133 are formed to have a "V" or "-" shape according to installation positions thereof with respect to a main body 110. In addition, referring to FIG. 7, an expanding portion 130 may also include only a plurality of first wing members 132, and a lower case 111 and an upper case 112 may also be formed to have quadrilateral cross sections. In this case, first expanding panels 135 of first wing members 132 may be formed to have a "-" shape. In addition, referring to FIG. 8, a lower case 111 and an upper case 112 may also be formed to have circular cross sections, and an expanding portion 130 may also include only a plurality of first wing members 132. In this case, first expanding panels 135 of the first wing members 132 may be formed to have an arc shape having a curvature corresponding to an edge of the lower case 111. In addition, referring to FIG. 9, a lower case 111 and an upper case 112 may also be formed to have quadrilateral cross sections, and an expanding portion 130 may also include only a plurality of first wing members 132. In this case, first expanding panels 135 of the first wing members 132 may be formed to have a semicircular shape having a predetermined curvature. Meanwhile, the shapes of the expanding portion 130 and the main body 110 are not limited thereto and may vary according to a purpose thereof.

The wing driving unit 140 includes fixed magnets 141 installed on one end portions of the first and second wing members 132 and 133 facing the manipulation member 120 and having predetermined magnetic forces, and an operating magnet unit 142 installed on an outer circumferential surface of the manipulation member 120 and generate an attractive force and a repulsive force with respect to the fixed magnets 141.

The plurality of fixed magnets 141 are installed on one end portions of the first extension panels 134 of the first wing members 132 and one end portions of the second extension panels 136 of the second wing members 133. In this case, the fixed magnet 141 installed on the first extension panels 134 may be installed such that an N pole thereof faces the manipulation member 120 and the fixed magnet 141 installed on the second extension panel 136 may be installed such that an S pole thereof faces the manipulation member 120.

The operating magnet unit 142 includes a plurality of first and second moving magnets 143 and 144 installed on the outer circumferential surface of the manipulation member 120.

The plurality of first moving magnets 143 are formed on the outer circumferential surface of the manipulation member 120 corresponding to a gap between the lower case 111 and the upper case 112 and are installed on opposite sides of a rotation center of the manipulation member 120. In this case, the first moving magnets 143 may be installed to be inserted into the manipulation member 120 such that the S poles are exposed to the outside.

The plurality of second moving magnets 144 are formed on the outer circumferential surface of the manipulation member 120 corresponding to the gap between the lower case 111 and the upper case 112 and are installed on opposite sides of the rotation center of the manipulation member 120. In this case, the second moving magnet 144 may be disposed between the first moving magnets 143, that is, positions spaced apart from the first moving magnet 143 in a rotation direction of the manipulation member 120, and may be installed to be inserted into the manipulation member 120 such that the N pole is exposed to the outside. In this case, the first and second moving magnets 143 and 144 may be set on the manipulation member 120 to face the first and second wing members 132 and 133.

The first and second moving magnets 143 and 144 are attractive magnets which generate attractive forces with respect to the fixed magnet 141 to move the wing member toward the manipulation member 120 according to rotation of the manipulation member 120 or are repulsive magnets which generate repulsive forces with respect to the fixed magnet 141 to move the wing member in the direction away from the manipulation member 120 when the manipulation member 120 rotates or moves upward or downward such that the first and second moving magnets 143 and 144 face the fixed magnet 141.

That is, in a case in which the first moving magnet 143 faces the first wing member 132 and the second moving magnet 144 faces the second wing member 133 due to rotation of the manipulation member 120, different poles of the first moving magnet 143 and the fixed magnet 141 installed on the first wing member 132 face each other, and different poles of the second moving magnet 144 and the fixed magnet 141 installed on the second wing member 133 also face each other so that the first and second moving magnets 143 and 144 become attractive magnets with respect to the fixed magnet 141 to generate attractive forces therebetween. In this case, the first and second wing members 132 and 133 are moved toward the manipulation member 120 due to the attractive forces generated between the first and second moving magnets 143 and 144 and the fixed magnet 141 so that an entire area of the expandable cover unit 100 is shrunk.

Meanwhile, in a case in which the second moving magnet 144 faces the first wing member 132 and the first moving magnet 143 faces the second wing member 133 due to rotation of the manipulation member 120, the same poles of the first moving magnet 143 and the fixed magnet 141 installed in the second wing member 133 face each other, and the same poles of the second moving magnet 144 and the fixed magnet 141 installed on the first wing member 132 also face each other so that the first and second moving magnets 143 and 144 become repulsive magnets forces with respect to the fixed magnet 141 to generate repulsive forces therebetween. In this case, the first and second wing members 132 and 133 move to protrude outward from the main body 110 due to the repulsive forces generated between the first and second moving magnets 143 and 144 and the fixed magnet 141 so that the entire area of the expandable cover unit 100 is expanded.

Meanwhile, although not illustrated in the drawings, the manipulation member 120 may be installed on the main body 110 to be vertically moveable, and the first moving magnet 143 and the second moving magnet 144 may be installed on the outer circumferential surface of the manipulation member 120 in a direction in which the manipulation member 120 moves upward and downward, that is, a vertical direction.

In the expandable cover unit 100 according to the present invention, which is formed as described above, since the plurality of wing members are installed to protrude outward from the main body 110, the area of the expandable cover unit 100 can be changed according to a use, and thus there is an advantage in that the expandable cover unit 100 can be used in a wider variety of ways. In this case, the expandable cover unit 100 can be used for various purposes such as a lid of a container and a sun screen like a parasol.

Figure 10:
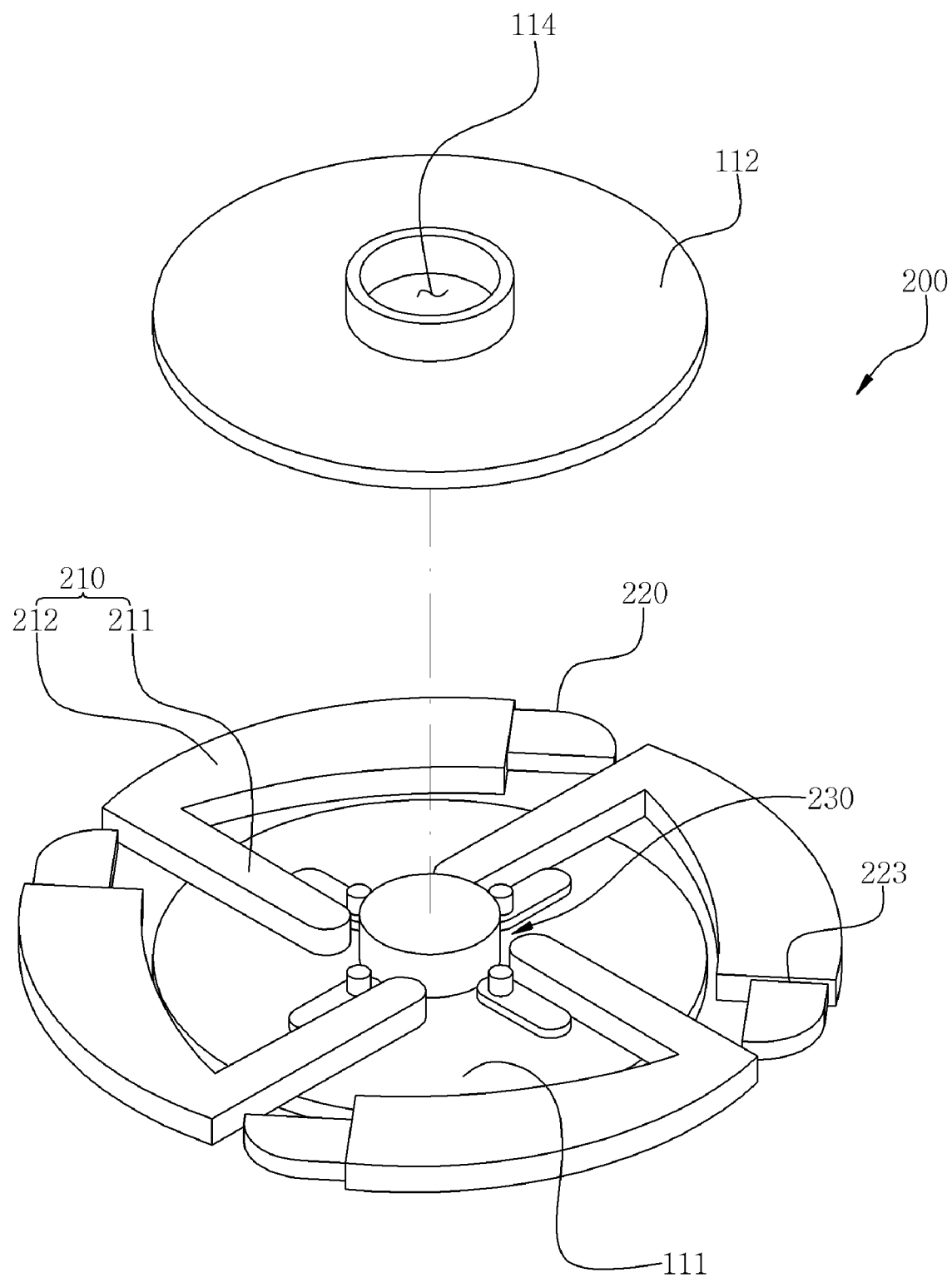
FIG. 10 is an exploded perspective view illustrating an expandable cover unit according to yet another embodiment of the present invention.

Meanwhile, an expanding portion 200 according to yet another embodiment of the present invention is illustrated in FIG. 10.

Referring to the drawing, the expanding portion 200 includes a plurality of third wing members 210 slidably installed on a main body 110 to be spaced apart from each other along a virtual circle having a predetermined radius around a manipulation member 120, a plurality of gap cover members 220 installed in wing members to be moveable into and out of the wing members in a direction intersecting a sliding direction of the wing member, and an attachment member installed on the gap cover member 220 to attach an end portion of the gap cover member 220 to the adjacent wing members.

The third wing member 210 is installed between an upper case 112 and a lower case 111 to be slidable in a radial direction of the lower case 111. The plurality of third wing members 210 are radially disposed around the manipulation member 120. The third wing member 210 includes a third extension panel 211 and a third expanding panel 212.

The third extension panel 211 is installed on the main body 110 such that one end portion of the third extension panel 211 faces the manipulation member 120 and extends a predetermined length in a sliding direction of the third wing member 210, that is, the radial direction of the lower case 111. In this case, guide protrusion (not shown) is formed on an upper surface of the second extension panel 136 to protrude upward to be inserted into guide groove 115 so that the second extension panel 136 moves along the guide groove 115.

The third expanding panel 212 is formed on the other end portion of the third extension panel 211 to protrude outward when the third extension panel 211 moves in the direction away from the manipulation member 120.

In this case, the third expanding panel 212 may be formed to be bent so as to have a curvature corresponding to a curvature of an edge of the lower case 111. In addition, an insertion hole 223 is formed in an end portion of the third expanding panel 212 so that the gap cover member 220 may be inserted into the insertion hole 223 to be moveable into and out of the insertion hole 223.

The gap cover member 220 is inserted into the insertion hole 223 of the third expanding panel 212 and formed to be bent so as to have a predetermined curvature corresponding to the third expanding panel 212. The attachment member, although not illustrated in the drawings, includes an auxiliary magnet formed on the end portion of the gap cover member 220 and having a predetermined magnetic force and a magnetic body installed on the third expanding panel 212 of the third wing member 210 facing the end portion of the gap cover member 220 and having predetermined magnetic properties to be magnetically coupled to the auxiliary magnet. The end portion of the gap cover member 220 is attached to the third expanding panel 212 of the third wing member 210 due to the attachment member.

In a case in which the third wing member 210 is close to the manipulation member 120, the gap cover member 220 is inserted into the third wing member 210, and in a case in which the third wing member 210 is moved in the direction away from the manipulation member 120, the gap cover member 220 protrudes from the third wing member 210.

Meanwhile, although not illustrated in the drawing, a wing driving unit 230 includes a driven gear part installed on an outer circumferential surface of the manipulation member 120 and provided with a plurality of first gear teeth spaced apart from each other in a circumferential direction, first idle pulleys rotatably installed on the main body 110 at positions adjacent to the manipulation member 120 to be engaged with the driven gear part, second idle pulleys installed on the main body 110 at positions spaced apart from the first idle pulleys in the sliding direction of the third wing members 210, and timing belts which are installed around the driven gear part and the idle pulleys to move due to rotation of the first idle pulleys, wherein the third wing member 210 is fixed to one side of the timing belt. The numbers of the first idle pulleys, the second idle pulleys, and the timing belts corresponding to the number of the third wing members 210 may be installed on the main body 110.

Figure 11:
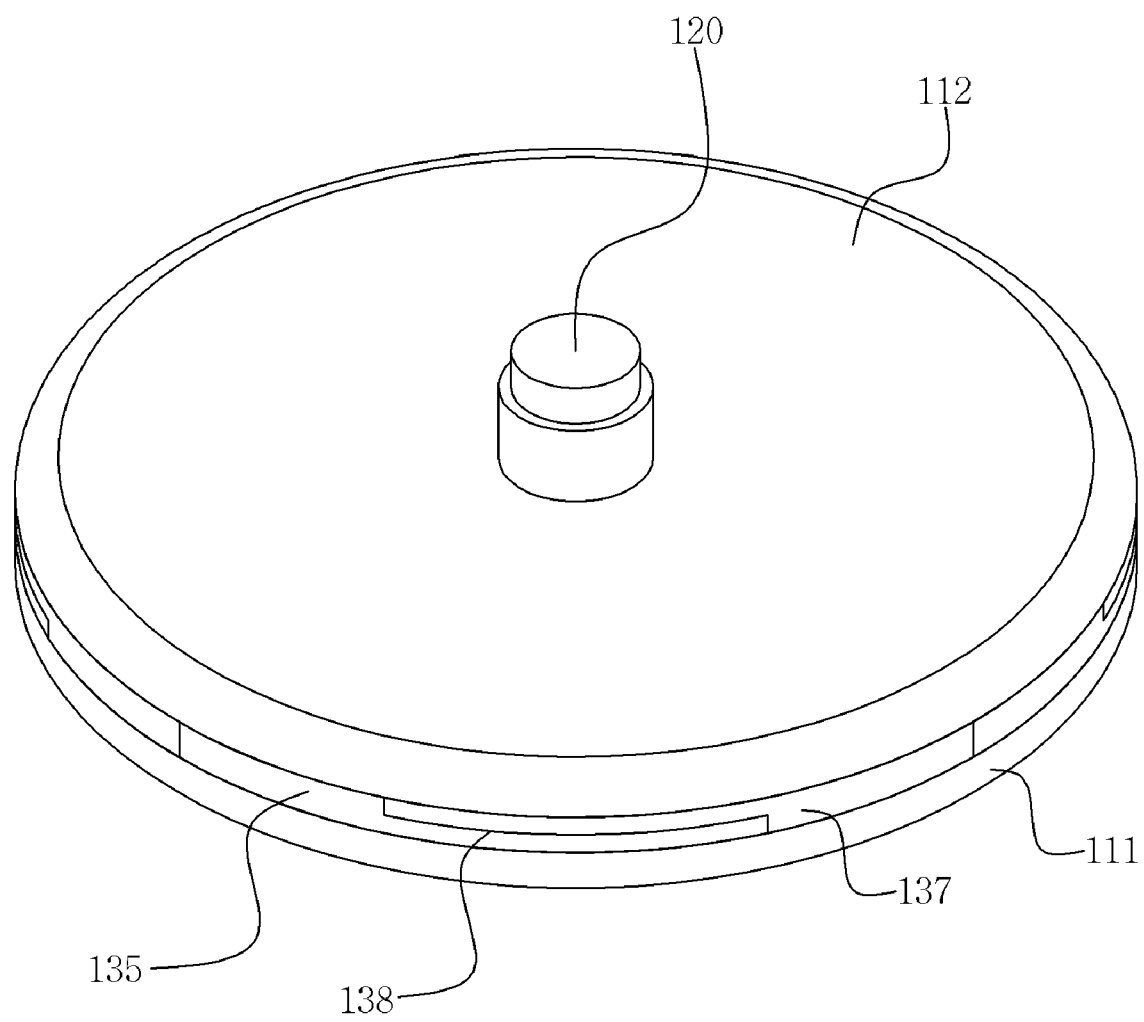
FIG. 11 is a perspective view illustrating an expandable cover unit according to yet another embodiment of the present invention.
Figure 12:
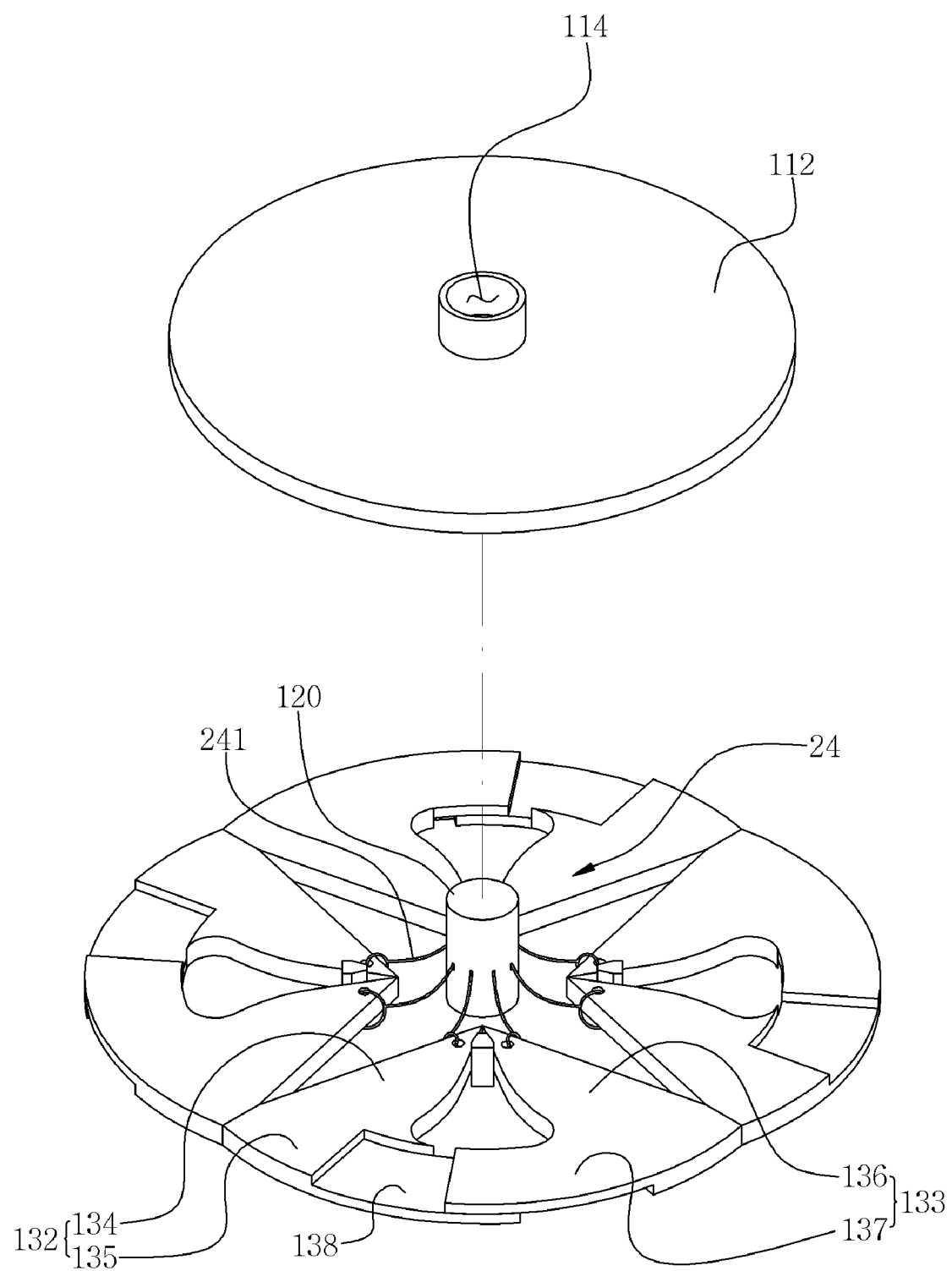
FIG. 12 is an exploded perspective view illustrating the expandable cover unit of FIG. 11.

Meanwhile, a wing driving unit 240 according to yet another embodiment of the present invention is illustrated in FIGS. 11 and 12.

Referring to the drawings, a manipulation member 120 is installed on a main body 110 to be vertically moveable, and the wing driving unit 240 includes a plurality of connecting members 241 of which both ends are connected to a manipulation member 120 and first and second wing members 132 and 133 such that the first and second wing members 132 and 133 are close to or spaced apart from the manipulation member 120 when the manipulation member 120 moves upward or downward with respect to the main body 110.

The connecting member 241 is formed of a material such as a wire having a predetermined strength, one end of the connecting member 241 is installed on an outer circumferential surface of the manipulation member 120 between a lower case 111 and an upper case 112, and the other end is installed on one end portion of first extension panel 134 or one end portion of second extension panel 136.

In a case in which a user pushes the manipulation member 120 downward to move the manipulation member 120 downward, due to the manipulation member 120 moving downward, the connecting members 241 move the first and second wing members 132 and 133 in the direction away from the manipulation member 120 so that the first and second wing members 132 and 133 protrude outward from the main body 110. Meanwhile, in a case in which the user moves the manipulation member 120 upward, due to the manipulation member 120 moving upward, the connecting member 241 moves the first and second wing members 132 and 133 such that the first and second wing members 132 and 133 become closer to the manipulation member 120, and the first and second wing members 132 and 133 are inserted into the main body 110.

Figure 13:
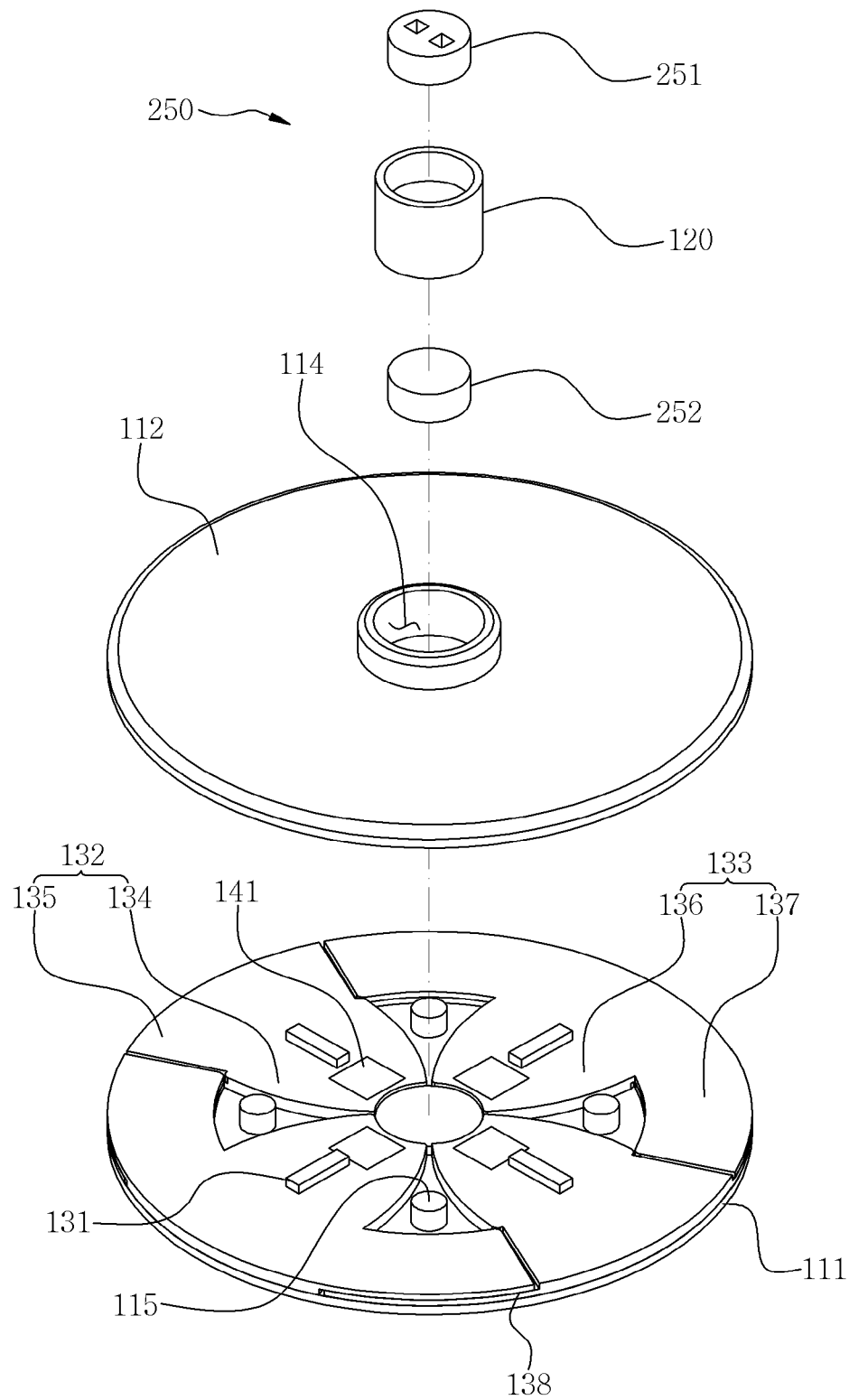
FIG. 13 is an exploded perspective view illustrating an expandable cover unit according to yet another embodiment of the present invention.

Meanwhile, a wing driving unit 250 according to yet another embodiment of the present invention is illustrated in FIG. 13.

Referring to the drawing, the wing driving unit 250 includes an attractive magnet 251 and a repulsive magnet 252 installed at two end portions of a manipulation member 120. In this case, the manipulation member 120 is installed such that any one end portion of the two end portions is coupled between a lower case 111 and an upper case 112 through a hollow 114 of the upper case 112, and fixed magnets 141 installed on first and second wing members 132 and 133 may be installed such that the same poles of N poles and S poles of the fixed magnets 141 face the manipulation member 120.

The attractive magnet 251 is installed on one end portion of the manipulation member 120 and generates an attractive force with respect to the fixed magnet 141 to move the first and second wing members 132 and 133 toward the manipulation member 120 when one end portion of the manipulation member 120 is coupled to a main body. A neodymium magnet having a pole different from a pole of the fixed magnet 141 facing the manipulation member 120 may be applied to the attractive magnet 251.

The repulsive magnet 252 is installed on the other end portion of the manipulation member 120 and generates a repulsive force with respect to the fixed magnet 141 to move the first and second wing members 132 and 133 in the direction away from the manipulation member 120 when the other end portion of the manipulation member 120 is coupled to the main body. A neodymium magnet having a pole which is the same as a pole of the fixed magnet 141 facing the manipulation member 120 may be applied to the repulsive magnet 252.

In a case in which an area of the expandable cover unit is expanded, a user inserts the other end portion of the manipulation member 120 into the hollow 114 of the upper case 112. In this case, a repulsive force is generated between the repulsive magnet 252 installed at the other end portion of the manipulation member 120 and the fixed magnets 141 installed on the first and second wing members 132 and 133 so that the first and second wing members 132 and 133 slide in the direction away from the manipulation member 120.

Meanwhile, in a case in which the area of the expandable cover unit is shrunk, the user inserts one end portion of the manipulation member 120 into the hollow 114 of the upper case 112. In this case, an attractive force is generated between the attractive magnet 251 installed at one end portion of the manipulation member 120 and the fixed magnets 141 installed on the first and second wing members 132 and 133 so that the first and second wing members 132 and 133 slide to be close to the manipulation member 120.

According to the present invention, since a plurality of wing members of an expandable cover unit are installed to protrude outward from a main body, an area of the expandable cover unit can be changed according to a purpose thereof, and thus the expandable cover unit can be used in a wider variety of ways.

The description about the disclosed embodiments is provided for those skilled in the art to use or implement the present invention. Various modifications of the embodiments will be clear to those skilled in the art, and general principles defined in the present specification may be applied to other embodiments without departing from the scope of the present invention. Therefore, the present invention is not limited to the embodiments disclosed in the present specification and should be interpreted within the widest scope consistent with the principles and novel features disclosed in the present specification.

What is claimed is:

1. An expandable cover unit comprising:
a main body;
a manipulation member installed on the main body to be moved by a manipulation of a user;
an expanding portion installed on the main body at a position adjacent to the manipulation member and provided with one or more wing members installed on the main body to be slidable in a direction away from the manipulation member such that an end portion of the wing member protrudes outward from the main body; and
a wing driving unit configured to operate the wing member to move the wing member according to the manipulation member moved by the manipulation of the user, wherein:
the manipulation member is installed on the main body to be rotatable or moveable upward or downward; and
the wing driving unit includes a fixed magnet installed on one end portion of the wing member facing the manipulation member and having a predetermined magnetic force,
an attractive magnet which is installed on an outer circumferential surface of the manipulation member and generates an attractive force with respect to the fixed magnet to move the wing member toward the manipulation member when the manipulation member rotates or moves upward or downward such that the attractive magnet faces the fixed magnet, and
a repulsive magnet which is installed on the outer circumferential surface of the manipulation member at a position spaced apart from the attractive magnet in a direction, in which the manipulation member rotates or moves upward or downward, and generates a repulsive force with respect to the fixed magnet to move the wing member in the direction away from the manipulation member when the manipulation member rotates or moves upward or downward such that the repulsive magnet faces the fixed magnet.

2. The expandable cover unit of claim 1, wherein:
the manipulation member is installed on the main body to be moveable upward and downward; and
the wing driving unit includes at least one connecting member of which both ends are installed at the manipulation member and the wing member such that the wing member is close to or spaced apart from the manipulation member when the manipulation member moves upward or downward with respect to the main body.

3. An expandable cover unit comprising:
a main body;
a manipulation member installed on the main body to be moved by a manipulation of a user;
an expanding portion installed on the main body at a position adjacent to the manipulation member and provided with one or more wing members installed on the main body to be slidable in a direction away from the manipulation member such that an end portion of the wing member protrudes outward from the main body; and
a wing driving unit configured to operate the wing member to move the wing member according to the manipulation member moved by the manipulation of the user,
wherein the expanding portion includes:
a plurality of first wing members slidably installed on the main body to be spaced apart from each other in a virtual circle having a predetermined radius around the manipulation member; and
a plurality of second wing members slidably installed on the main body between the first wing members, and
wherein the first wing member includes:

a first extension panel installed on the main body such that one end portion of the first extension panel faces the manipulation member and extends a predetermined length in a sliding direction of the first wing member; and a first expanding panel formed on the other end portion of the first extension panel to protrude outward from the main body when the first extension panel moves in the direction away from the manipulation member, extending in a direction intersecting a longitudinal direction of the first extension panel, and provided with an inlet recessed downward a predetermined depth with respect to an upper surface of the first expanding panel.

4. The expandable cover unit of claim 3, wherein the second wing member includes:

a second extension panel installed on the main body such that one end portion of the second extension panel faces the manipulation member and extends a predetermined length in a sliding direction of the second wing member; and a second expanding panel formed on the other end portion of the second extension panel to protrude outward when the second extension panel moves in the direction away from the manipulation member, and extending toward the first expanding panel to be inserted into the inlet when the first and second wing members move to be close to the manipulation member.

5. An expandable cover unit comprising:

a main body;

a manipulation member installed on the main body to be moved by a manipulation of a user;

an expanding portion installed on the main body at a position adjacent to the manipulation member and provided with one or more wing members installed on the main body to be slidable in a direction away from the manipulation member such that an end portion of the wing member protrudes outward from the main body; and a wing driving unit configured to operate the wing member to move the wing member according to the manipulation member moved by the manipulation of the user, wherein:

any one end portion of two end portions of the manipulation member is detachably coupled to the main body at a position adjacent to one end portion of the wing member; and the wing driving unit includes a fixed magnet installed on the one end portion of the wing member facing the manipulation member and has a predetermined magnetic force, an attractive magnet which is installed on the one end portion of the manipulation member and generates an attractive force with respect to the fixed magnet to move the wing member toward the manipulation member when the one end portion of the manipulation member is coupled to the main body, and a repulsive magnet which is installed on the other end portion of the manipulation member and generates a repulsive force with respect to the fixed magnet to move the wing member in the direction away from the manipulation member when the other end portion of the manipulation member is coupled to the main body.

* * * * *